US012580244B2

(12) United States Patent
Han et al.

(10) Patent No.: US 12,580,244 B2
(45) Date of Patent: Mar. 17, 2026

(54) BATTERY MODULE AND BATTERY PACK INCLUDING THE SAME

(71) Applicant: LG ENERGY SOLUTION, LTD., Seoul (KR)

(72) Inventors: Honggoo Han, Daejeon (KR); Junyeob Seong, Daejeon (KR); Won Kyoung Park, Daejeon (KR); Subin Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 471 days.

(21) Appl. No.: 18/020,354

(22) PCT Filed: Jan. 6, 2022

(86) PCT No.: PCT/KR2022/000250
§ 371 (c)(1),
(2) Date: Feb. 8, 2023

(87) PCT Pub. No.: WO2022/149886
PCT Pub. Date: Jul. 14, 2022

(65) Prior Publication Data
US 2023/0275283 A1 Aug. 31, 2023

(30) Foreign Application Priority Data
Jan. 11, 2021 (KR) ........................ 10-2021-0003180

(51) Int. Cl.
*H01M 10/65* (2014.01)
*H01M 10/653* (2014.01)
(Continued)

(52) U.S. Cl.
CPC ..... *H01M 10/6555* (2015.04); *H01M 10/653* (2015.04); *H01M 50/211* (2021.01)

(58) Field of Classification Search
CPC ......... H01M 10/6555; H01M 10/6554; H01M 10/6551; H01M 10/655; H01M 10/653; H01M 50/211; H01M 50/213
See application file for complete search history.

(56) References Cited

U.S. PATENT DOCUMENTS

| | | | |
|---|---|---|---|
| 1,038,223 A | 9/1912 | Smith | |
| 10,756,399 B2 * | 8/2020 | Liu ................... | H01M 10/6556 |

(Continued)

FOREIGN PATENT DOCUMENTS

| | | |
|---|---|---|
| CN | 102916235 A | 2/2013 |
| CN | 104604019 A | 5/2015 |

(Continued)

*Primary Examiner* — Raymond Alejandro
(74) *Attorney, Agent, or Firm* — Bryan Cave Leighton Paisner LLP

(57) ABSTRACT

A battery module includes a battery cell stack comprising a plurality of battery cells. Each of the plurality of battery cells includes a first electrode lead and a second electrode lead. The battery module includes a cooling fin positioned between two adjacent battery cells of the plurality of battery cells. The first electrode lead and the second electrode lead protrude from each of the plurality of battery cells in opposite directions. The cooling fin comprises a first zone, a second zone and a third zone. The first zone and the second zone are spaced apart from each other along a direction parallel to a protruding direction of the first electrode lead and the second electrode lead. The third zone is between the first zone and the second zone. T width of the third zone is smaller than a width of the first zone and a width of the second zone.

10 Claims, 10 Drawing Sheets

(51) Int. Cl.
  *H01M 10/6555* (2014.01)
  *H01M 50/211* (2021.01)

(56) References Cited

U.S. PATENT DOCUMENTS

| | | | |
|---|---|---|---|
| 10,903,533 B2 * | 1/2021 | Lim .................... H01M 10/482 |
| 11,424,496 B2 * | 8/2022 | Jeon .................... H01M 10/625 |
| 2012/0219838 A1 | 8/2012 | Terada |
| 2012/0282506 A1 | 11/2012 | Hohenthanner et al. |
| 2013/0034768 A1 | 2/2013 | Tsuchiya et al. |
| 2013/0045410 A1 | 2/2013 | Yang et al. |
| 2015/0147622 A1 | 5/2015 | Hwang et al. |
| 2015/0221996 A1 | 8/2015 | Jin |
| 2016/0218339 A1 | 7/2016 | Nishimori et al. |
| 2018/0026296 A1 | 1/2018 | Kruger |
| 2018/0062225 A1 | 3/2018 | You |
| 2018/0183117 A1 | 6/2018 | Cho et al. |
| 2018/0309175 A1 | 10/2018 | Chorian et al. |
| 2020/0153058 A1 | 5/2020 | Shimazaki |
| 2020/0243935 A1 | 7/2020 | Morita et al. |
| 2020/0274213 A1 | 8/2020 | Cho et al. |
| 2020/0388892 A1 | 12/2020 | Kim |
| 2022/0102813 A1 | 3/2022 | Cho et al. |
| 2022/0173453 A1 | 6/2022 | Yang et al. |
| 2023/0275283 A1 | 8/2023 | Han et al. |

FOREIGN PATENT DOCUMENTS

| | | | |
|---|---|---|---|
| CN | 207116550 U | 3/2018 |
| CN | 210224223 U | 3/2020 |
| CN | 216958206 U | 7/2022 |
| DE | 102013021549 A1 | 6/2015 |
| JP | 07-134973 A | 5/1995 |
| JP | 2012-252959 A | 12/2012 |
| JP | 2013-051099 A | 3/2013 |
| JP | 2014010983 A | 1/2014 |
| JP | 2015064959 A | 4/2015 |
| JP | 2016-058285 A | 4/2016 |
| JP | 2018125124 A | 8/2018 |
| JP | 2020080219 A | 5/2020 |
| KR | 10-1205180 B1 | 11/2012 |
| KR | 10-2014-0059357 A | 5/2014 |
| KR | 10-2014-0144787 A | 12/2014 |
| KR | 10-2014-0147979 A | 12/2014 |
| KR | 10-1524007 B1 | 5/2015 |
| KR | 10-1544548 B1 | 8/2015 |
| KR | 10-2016-0146587 A | 12/2016 |
| KR | 10-2020-0067588 A | 6/2020 |
| KR | 10-2020-0109127 A | 9/2020 |
| KR | 10-2020-0129991 A | 11/2020 |
| WO | 2016131141 A1 | 8/2016 |
| WO | 2017052194 A1 | 3/2017 |
| WO | 2020231071 A1 | 11/2020 |

* cited by examiner

FIG. 7

State at the time of swelling

100

BATTERY MODULE AND BATTERY PACK INCLUDING THE SAME

CROSS-REFERENCE TO RELATED APPLICATION(S)

This application is a National Phase entry pursuant to 35 U.S.C. 371 of International Application PCT/KR2022/000250 filed on Jan. 6, 2022, which claims priority from and the benefit of Korean Patent Application No. 10-2021-0003180 filed on Jan. 11, 2021 with the Korean Intellectual Property Office, the disclosure of which is incorporated herein by reference in its entirety.

TECHNICAL FIELD

The present disclosure relates to a battery module and a battery pack including the same, and more particularly, to a battery module having a cooling fin, and a battery pack including the same.

BACKGROUND

In modern society, as portable devices such as a mobile phone, a notebook computer, a camcorder and a digital camera has been daily used, the development of technologies in the fields related to portable devices as described above has been activated. In addition, chargeable/dischargeable secondary batteries are used as a power source for an electric vehicle (EV), a hybrid electric vehicle (HEV), a plug-in hybrid electric vehicle (P-HEV) and the like, in an attempt to solve air pollution and the like caused by existing gasoline vehicles using fossil fuel. Therefore, there is a growing need for development of the secondary battery.

Currently commercialized secondary batteries include a nickel cadmium battery, a nickel hydrogen battery, a nickel zinc battery, and a lithium secondary battery. Among them, the lithium secondary battery has come into the spotlight because they have advantages, for example, hardly exhibiting memory effects compared to nickel-based secondary batteries and thus being freely charged and discharged, and having very low self-discharge rate and high energy density.

Such lithium secondary battery mainly uses a lithium-based oxide and a carbonaceous material as a positive electrode active material and a negative electrode active material, respectively. The lithium secondary battery includes an electrode assembly in which a positive electrode plate and a negative electrode plate, each being coated with the positive electrode active material and the negative electrode active material, are disposed with a separator being interposed between them, and a battery case which seals and houses the electrode assembly together with an electrolyte solution.

Generally, the lithium secondary battery may be classified based on the shape of the exterior material into a can type secondary battery in which the electrode assembly is built in a metal can, and a pouch-type secondary battery in which the electrode assembly is built in a pouch of an aluminum laminate sheet.

In the case of a secondary battery used for small-sized devices, two to three battery cells are disposed, but in the case of a secondary battery used for a middle or large-sized device such as an automobile, a battery module in which a large number of battery cells are electrically connected is used. In such a battery module, a large number of battery cells are connected to each other in series or parallel to form a cell assembly, thereby improving capacity and output. In addition, one or more battery modules can be mounted together with various control and protection systems such as a battery management system (BMS) and a cooling system to form a battery pack.

FIG. 1 is a perspective view showing a conventional battery module.

Referring to FIG. 1, the conventional battery module 10 may include a battery cell stack 20 in which a plurality of battery cells 11 are stacked. The battery cell 11 may be a pouch-type battery cell. A cooling fin 30 made of a metal plate having high heat conductivity may be disposed between the battery cells 11. Generally, the cooling fin 30 is a plate-shaped member having a constant thickness.

FIG. 2 is a plan view of the battery cell included in the battery module of FIG. 1 as viewed from various angles. Specifically, (a) of FIG. 2 is a plan view of the battery cell 11 of FIG. 1 as viewed from the −z-axis direction on the xy plane, and (b) of FIG. 2 is a plan view of the battery cell 11 of FIG. 1 as viewed from the −x-axis direction on the yz plane.

First, referring to (a) of FIG. 2, in the process of repeatedly charging and discharging the battery cells 11, a phenomenon where the internal electrolyte is decomposed and gas is generated so that the battery cell 11 swells up, that is, a swelling phenomenon, may occur. Comparing the degree of swelling, the central portion swells much larger than both end parts from which the electrode leads 11L protrude as indicated by the dotted line. If the swelling of each battery cell 11 cannot be suppressed, a plurality of battery cells 11 may cause a structural deformation of the stacked battery module 10, and can adversely affect the durability of the battery module 10.

Next, referring to (b) of FIG. 2, when the battery cell 11 is repeatedly charged and discharged, a large amount of heat is generated in the electrode lead 11L portion of the battery cell 11. Thereby, terrace portions T1 and T2, which are the regions including the end portions in the direction in which the electrode leads 11L protrude, show a more excessive degree of heat generation than other portions. That is, the terrace portions T1 and T2 show a higher temperature than the central portion M between the terrace portions T1 and T2. The temperature imbalance between portions of the battery cells 11 leads to deterioration in performance and lifespan.

Therefore, there is a need for a device capable of effectively controlling the swelling of the battery cell and reducing the temperature deviation between portions of the battery cells.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY

The present disclosure has been devised to solve the above-mentioned problems, and an object of the present disclosure is to provide a battery module having a cooling fin that can control the swelling of the battery cell and reduce the temperature deviation between portions of the battery cells, and a battery pack including the same.

However, the problem to be solved by embodiments of the present disclosure is not limited to the above-described problems, and can be variously expanded within the scope of the technical idea included in the present disclosure.

According to one embodiment of the present disclosure, there is provided a battery module comprising: a battery cell stack comprising a plurality of battery cells, each of the plurality of battery cells including a first electrode lead and a second electrode lead; and a cooling fin positioned between the plurality of battery cells, wherein the first electrode lead and the second electrode lead protrude from each of the battery cells in opposite directions, the cooling fin comprises a first zone, a second zone and a third zone, the first zone and the second zone are spaced apart from each other along a direction parallel to a protruding direction of the first electrode lead and the second electrode lead, the third zone is between the first zone and the second zone, and a width of the third zone is smaller than a width of the first zone and a width of the second zone.

The battery cell may include a first terrace portion, a second terrace portion, and a central portion between the first terrace portion and the second terrace portion. The first electrode lead may protrude from one end of the first terrace portion, and the second electrode lead may protrude from one end of the second terrace portion. The first zone, the second zone, and the third zone may be positioned to correspond to the first terrace portion, the second terrace portion, and the central portion, respectively.

A distance between the central portion and the third zone may be greater than a distance between the first terrace portion and the first zone.

A distance between the central portion and the third zone may be greater than a distance between the second terrace portion and the second zone.

The width of the first zone and the width of the second zone may be gradually reduced toward the third zone.

Each of the first zone and the second zone may have an empty space formed therein.

The cooling fin may be a metal plate having an air layer formed therein.

The battery cell may be a pouch-type battery cell.

According to another embodiment of the present disclosure, there is provided a battery pack comprising: the above-mentioned battery module; a pack frame for housing the battery module; and a thermal conductive resin layer between the battery module and a bottom portion of the pack frame, wherein the cooling fin extends from a lower surface of the battery cell stack, and the cooling fin may be in contact with the thermal conductive resin layer.

The lower surface of the battery cell stack may be in contact with the thermal conductive resin layer.

According to the embodiment of the present disclosure, cooling fins having different thicknesses for each portion are arranged between the battery cells, so that pressure can be uniformly applied to each portion of the battery cell when the battery cell swells.

In addition, it is possible to enhance a contact property between an excessive heat generation portion of the battery cell and the cooling fin and thus reduce the temperature deviation of the battery cells.

Further, an air layer is provided inside the cooling fins, so that it is possible to have the cooling and heat dissipation performance and, at the same time, cut off fire or heat generated from any of the battery cells from propagating to the adjacent battery cells.

The effects of the present disclosure are not limited to the effects mentioned above and additional other effects not described above will be clearly understood from the description of the appended claims by those skilled in the art.

BRIEF DESCRIPTION OF DRAWINGS

The accompanying drawings, which are incorporated in and constitute a part of this specification, illustrate various exemplary embodiments and together with the description, serve to explain the principles of the disclosed embodiments.

Figure 1:
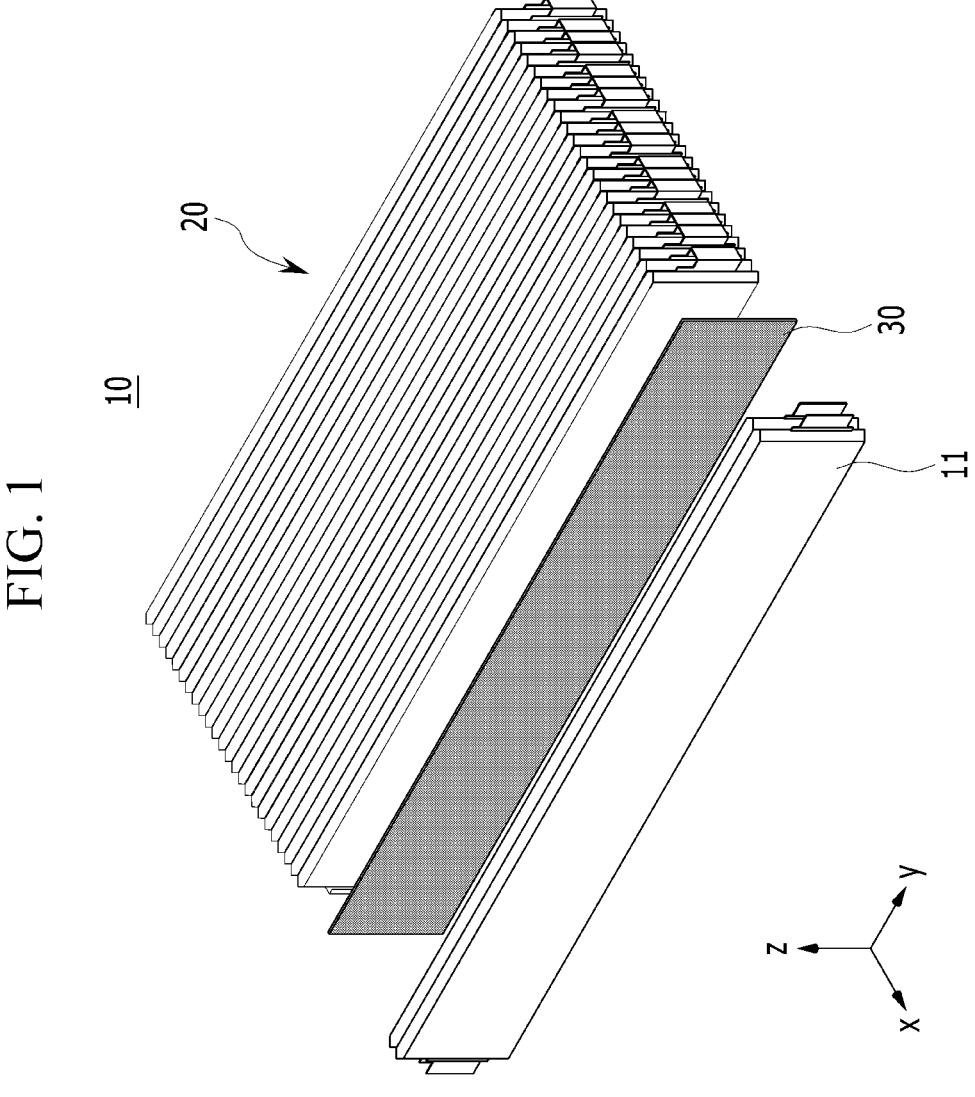
Figure 2:
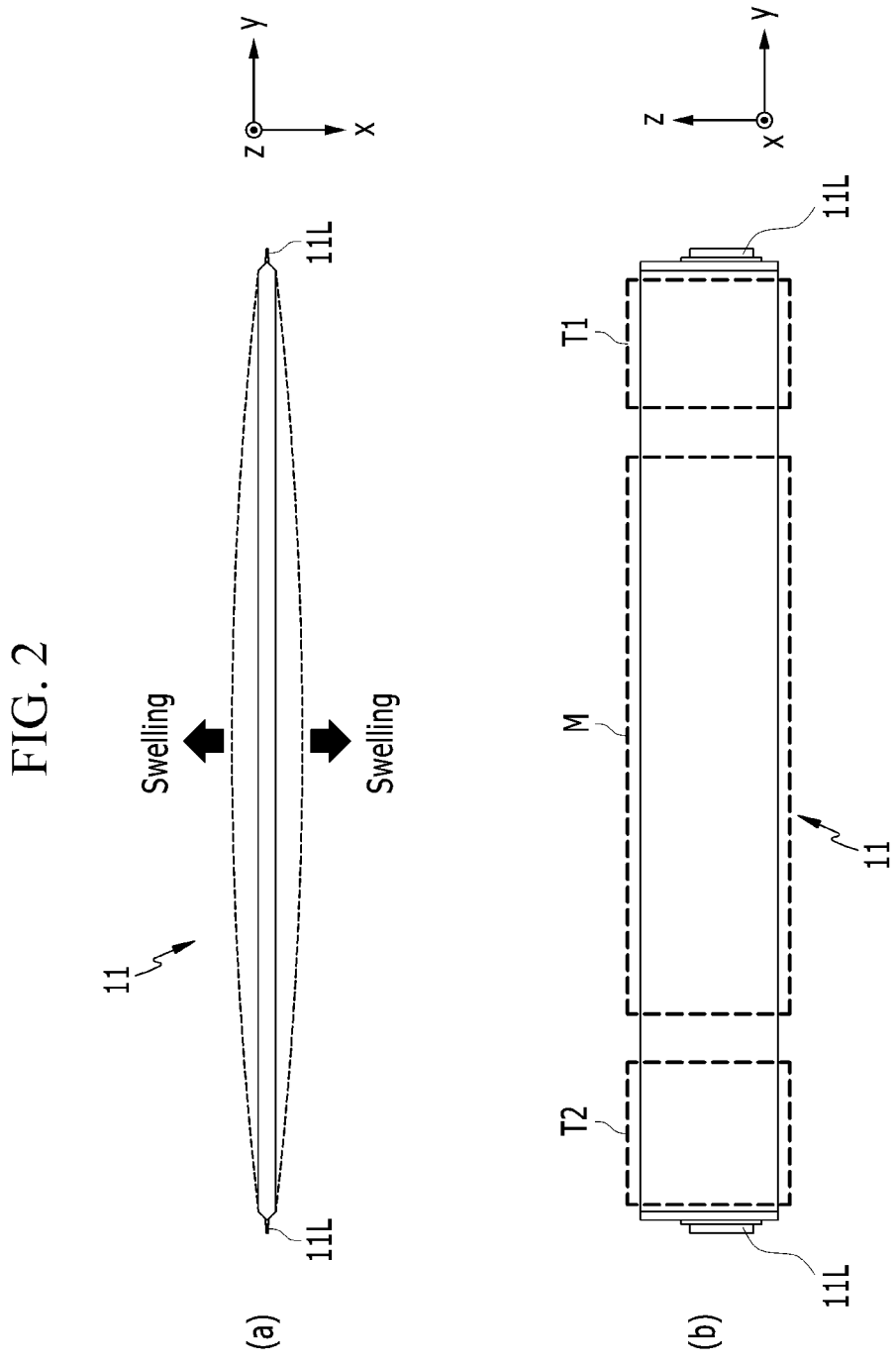
Figure 3:
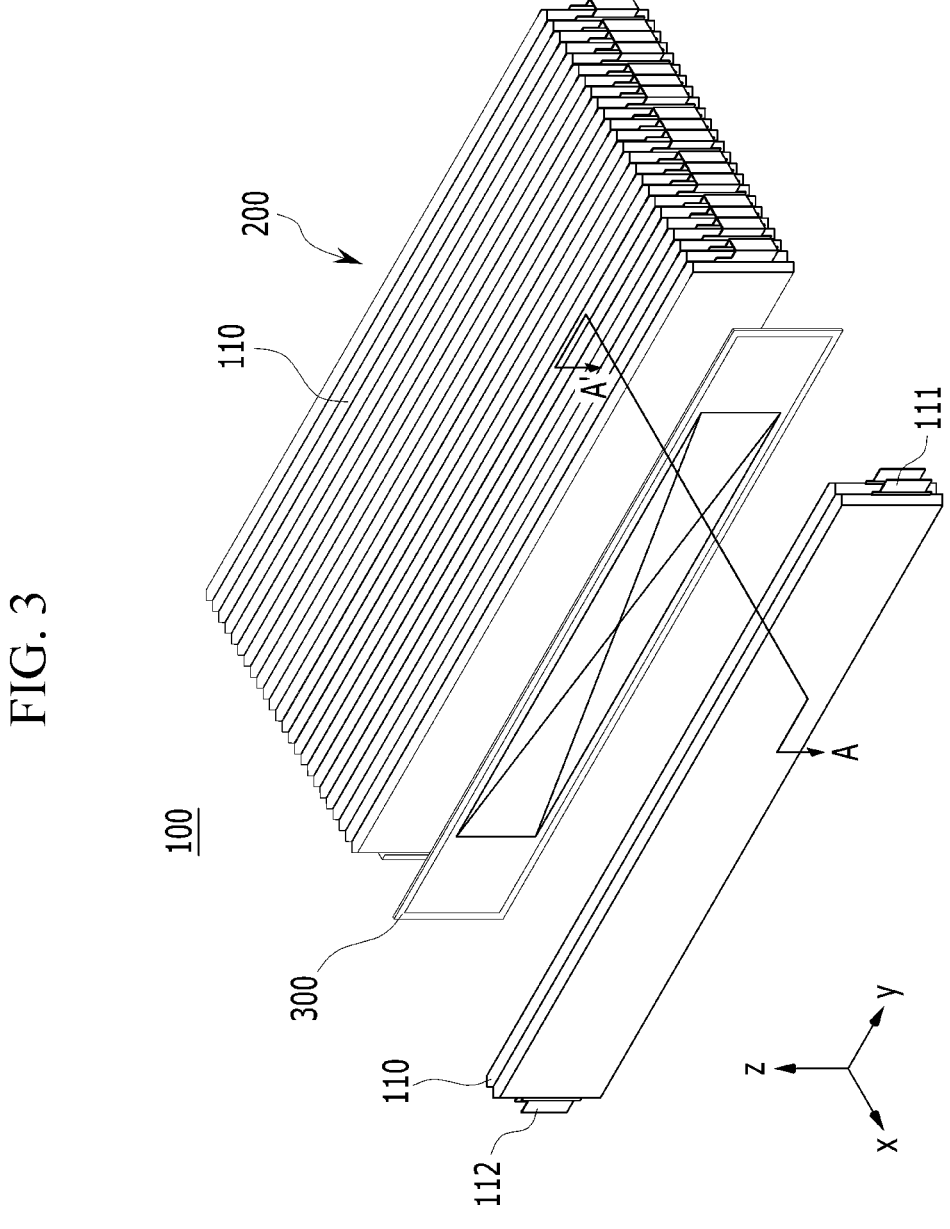
Figure 4:
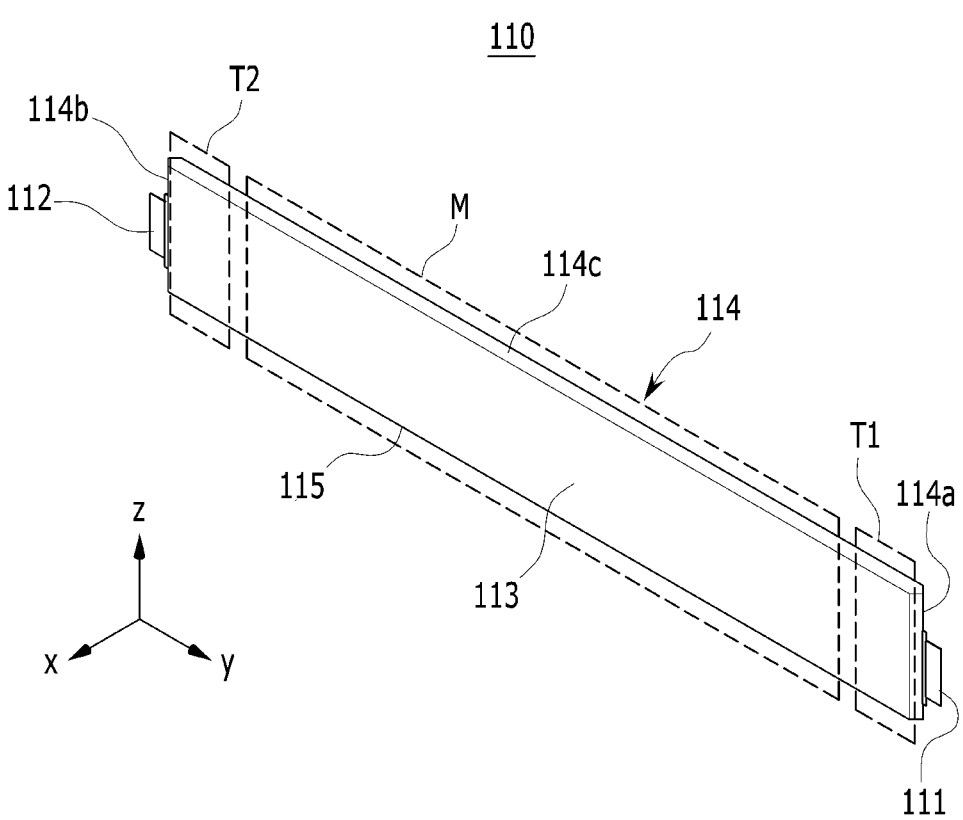
Figure 5:
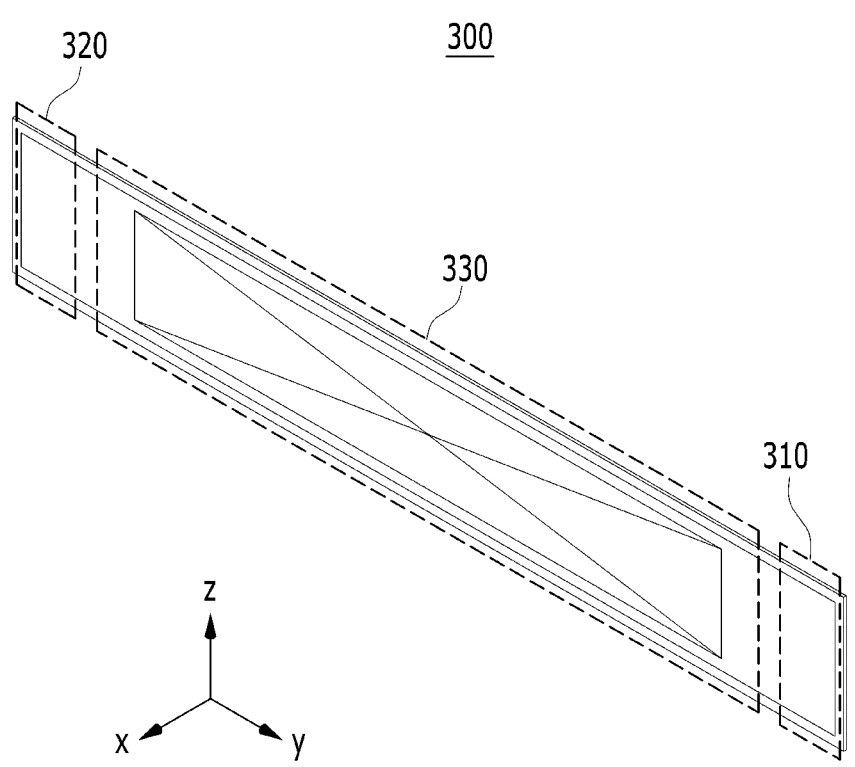
Figure 6:
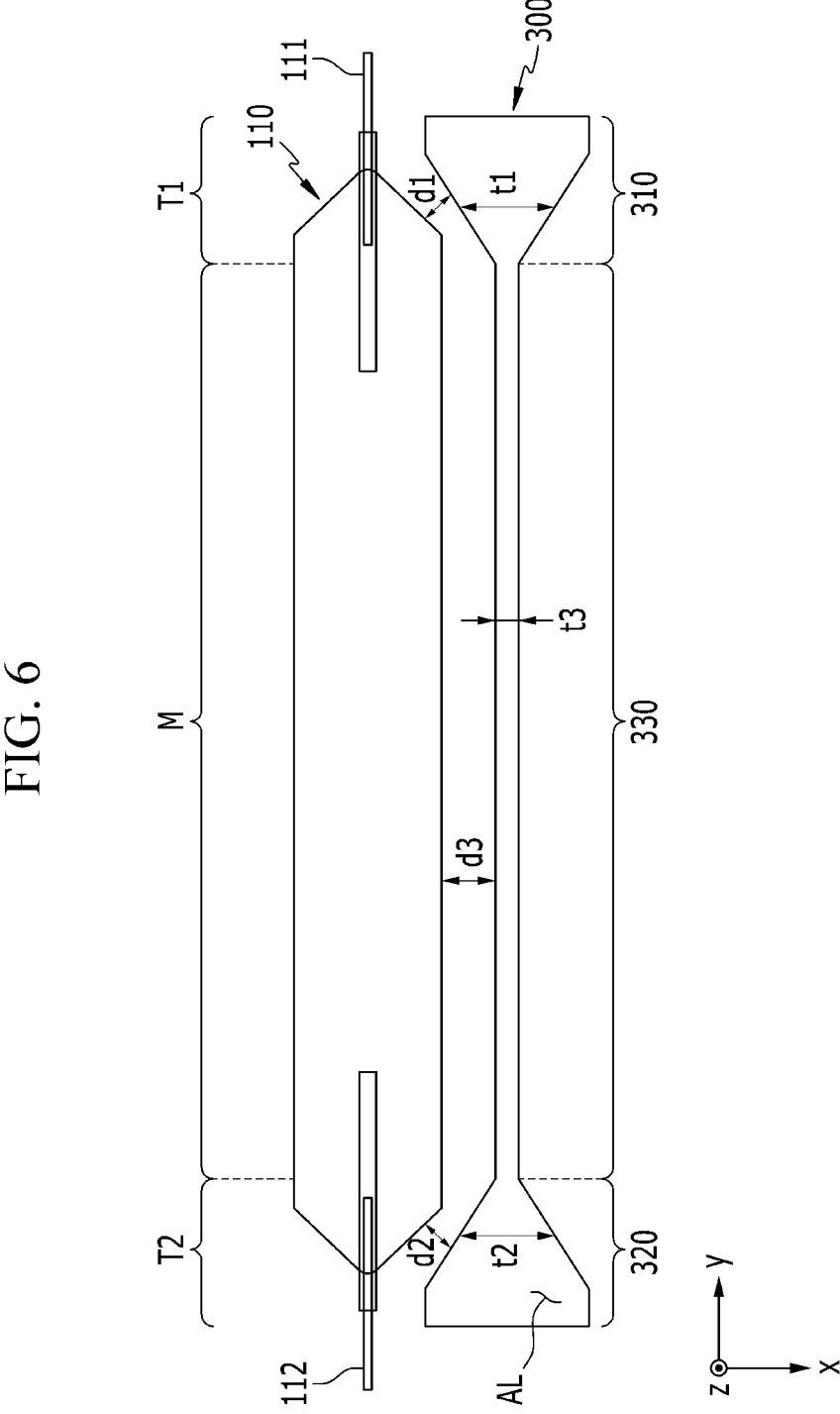
Figure 8:
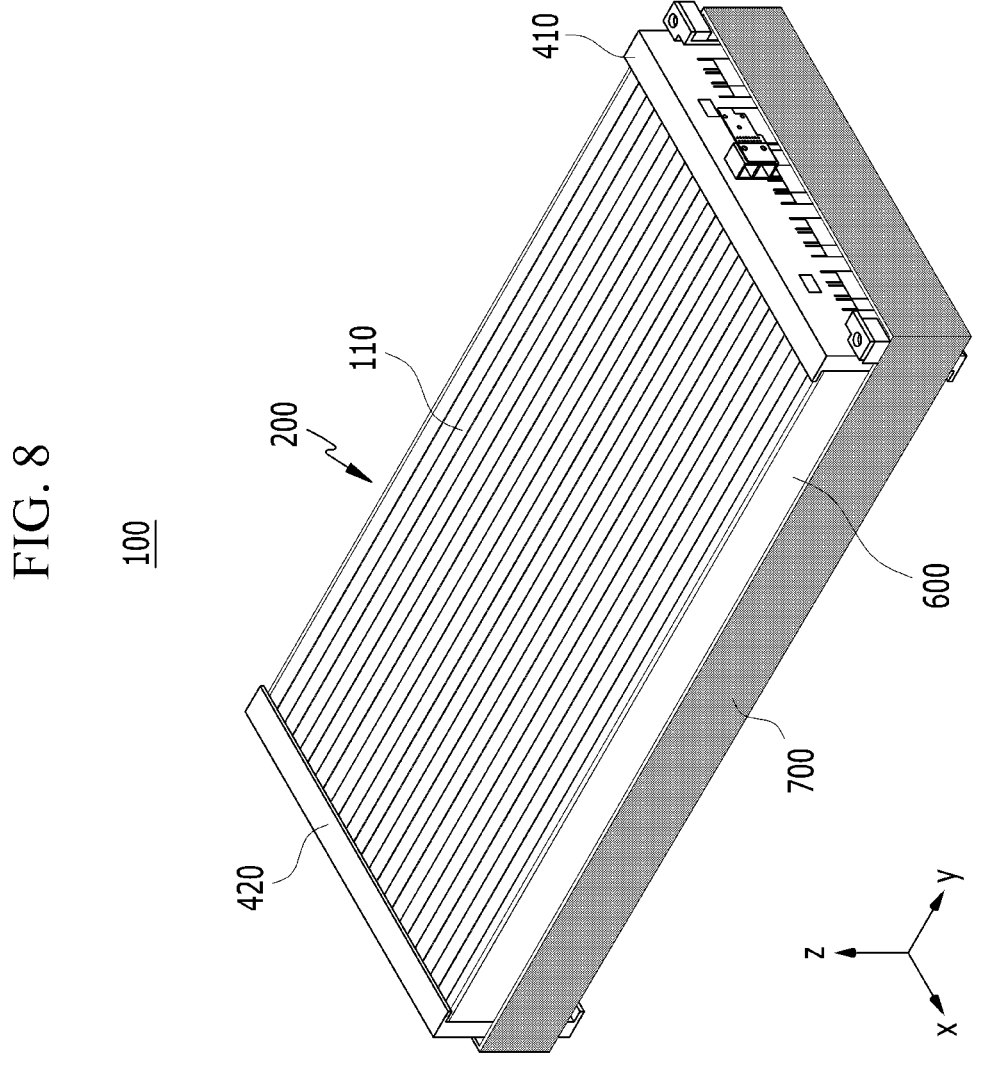
Figure 9:
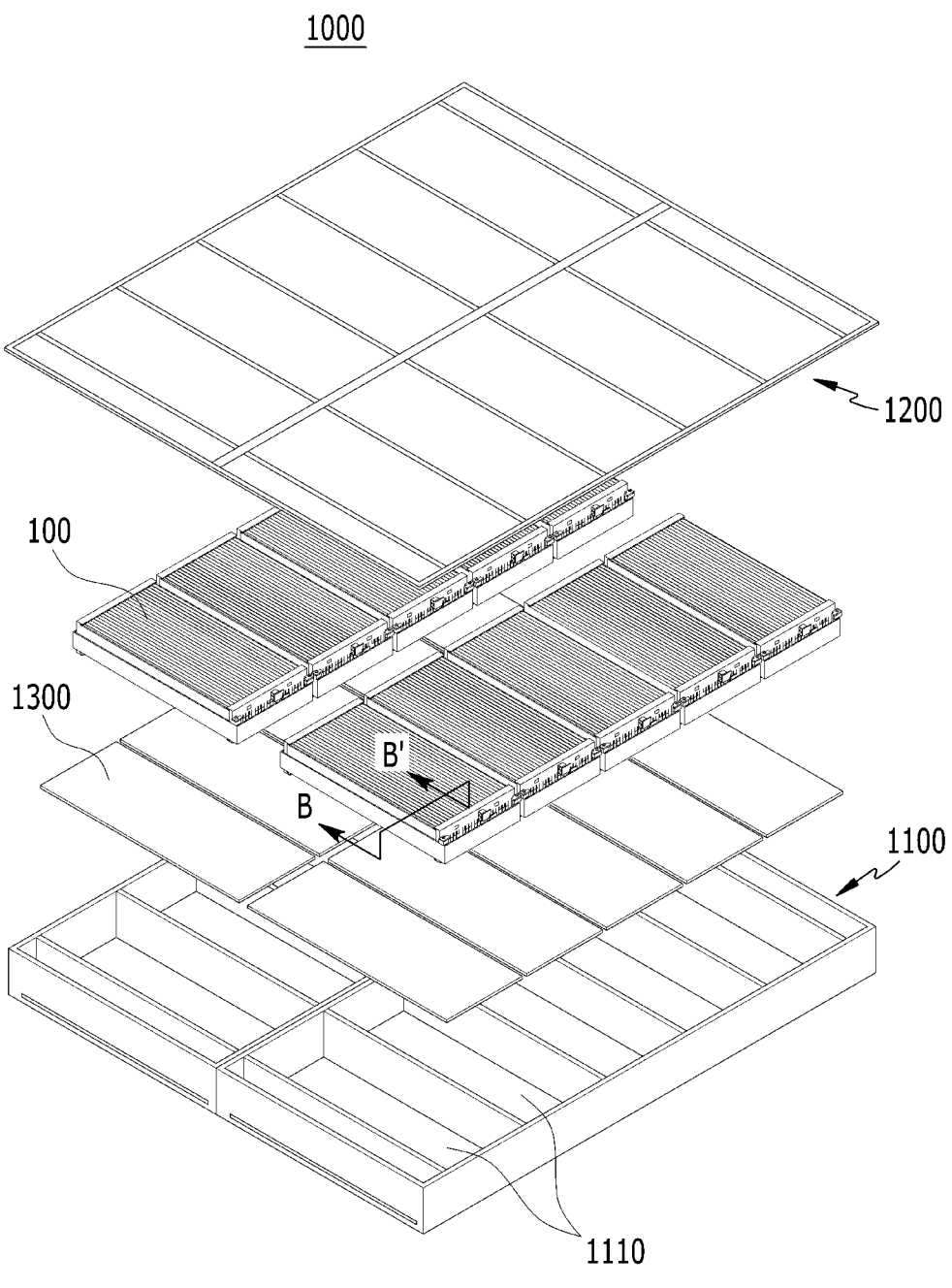
Figure 10:
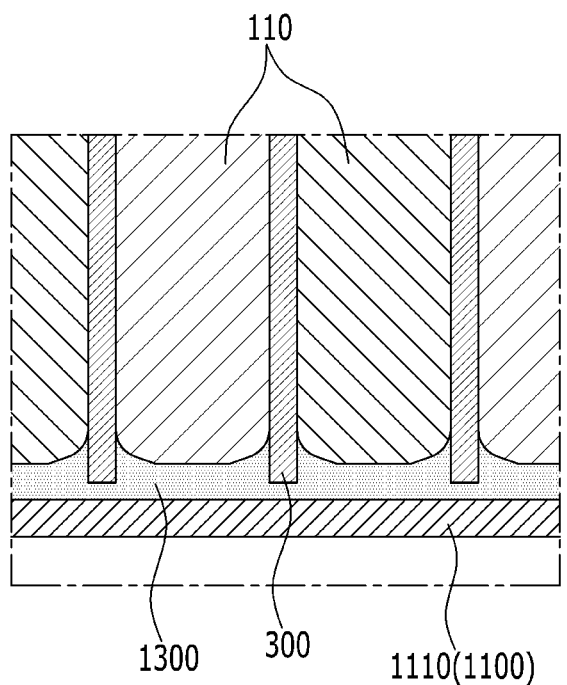

FIG. 1 is a perspective view showing a conventional battery module;

FIG. 2 is a plan view of the battery cell included in the battery module of FIG. 1 as viewed from various angles;

FIG. 3 is a perspective view showing a battery cell stack and a cooling fin according to an embodiment of the present disclosure;

FIG. 4 is a perspective view showing a battery cell included in the battery cell stack of FIG. 3;

FIG. 5 is a perspective view showing a cooling fin of FIG. 3;

FIG. 6 is a cross-sectional view showing a cross-section taken along the cutting line A-A' of FIG. 3;

Figure 7:
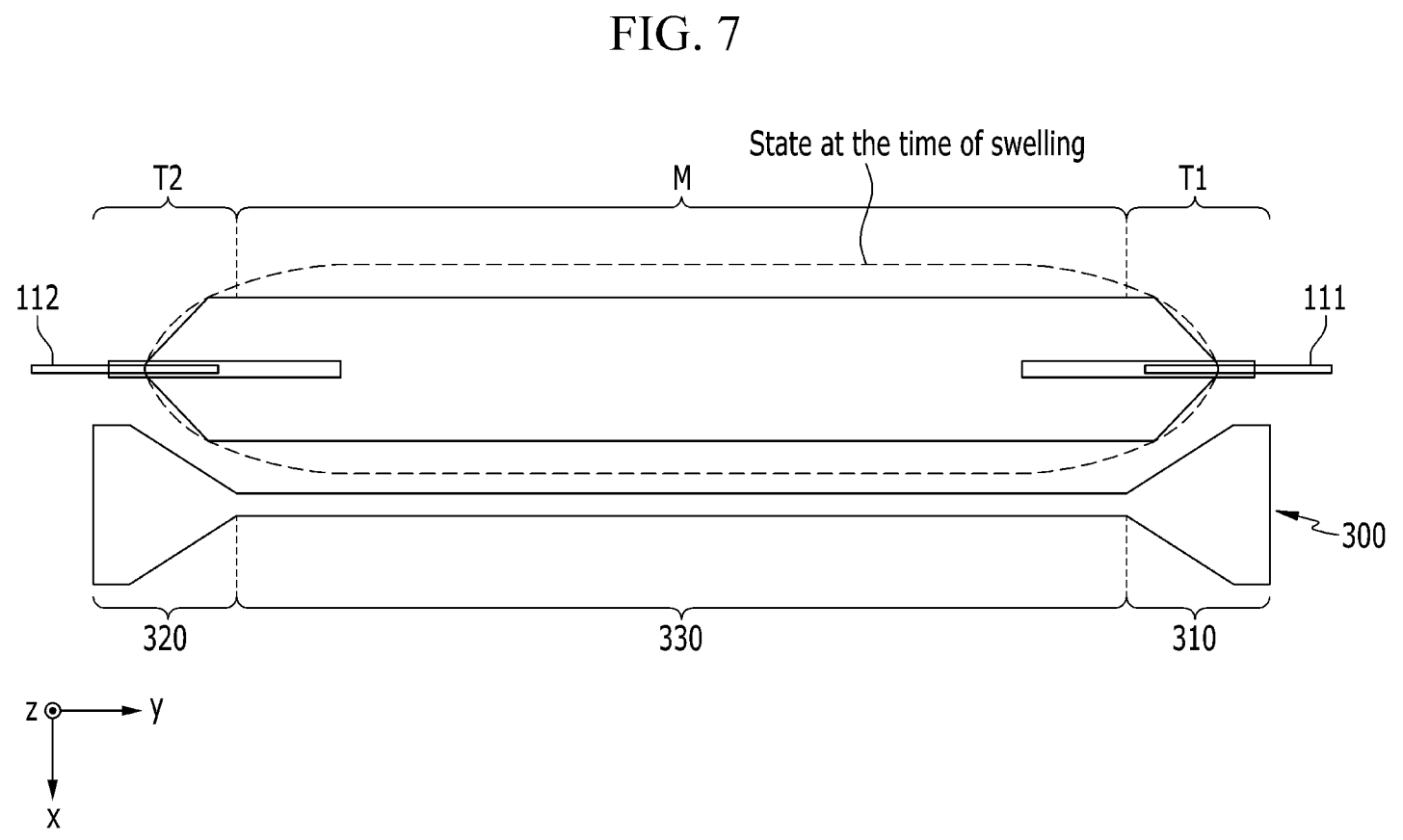

FIG. 7 is a plan view showing the state of the battery cell of FIG. 6 at the time of swelling;

FIG. 8 is a perspective view showing a battery module according to an embodiment of the present disclosure;

FIG. 9 is an exploded perspective view showing a battery pack according to an embodiment of the present disclosure; and FIG. 10 is a cross-sectional view showing a cross-section taken along the cutting line B-B' of FIG. 9.

DETAILED DESCRIPTION

Hereinafter, various embodiments of the present disclosure will be described in detail with reference to the accompanying drawings so that those skilled in the art can easily carry out them.

The embodiments of the present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a part is referred to as "including" a certain component, it means that it can further include other components, without excluding the other components, unless otherwise stated.

FIG. 3 is a perspective view showing a battery cell stack and a cooling fin according to an embodiment of the present disclosure. FIG. 4 is a perspective view showing a battery cell included in the battery cell stack of FIG. 3. FIG. 5 is a perspective view showing a cooling fin of FIG. 3. FIG. 6 is a cross-sectional view showing a cross-section taken along the cutting line A-A' of FIG. 3. At this time, FIG. 6 shows only one battery cell and one cooling fin for convenience of explanation, and the electrode assembly inside the battery cell is omitted.

First, referring to FIGS. 3 and 4, the battery module 100 according to an embodiment of the present disclosure includes a battery cell stack 200 in which a plurality of battery cells 110 including a first electrode lead 111 and a second electrode lead 112 are stacked; and cooling fins 300 positioned between the battery cells 110.

First, the battery cell 110 is preferably a pouch-type battery cell, and may be formed into a rectangular sheet-like structure. The first and second electrode leads 111 and 112 according to the present embodiment protrude from the battery cells 110 in the direction opposite to each other. Specifically, the battery cells 110 according to the present embodiment have a structure in which the first and second electrode leads 111 and 112 are opposed to each other with respect to the cell body 113 and protrude from one end 114a and the other end 114b, respectively. More specifically, the first and second electrode leads 111 and 112 are connected to an electrode assembly (not shown) and protrude from the electrode assembly (not shown) to the outside of the battery cell 110. The first and second electrode leads 111 and 112 have different polarities, and for example, one of them may be a positive electrode lead 111 and the other may be a negative electrode lead 112. That is, the positive electrode lead 111 and the negative electrode lead 112 can be protruded so as to face in opposite directions with reference to one battery cell 110.

Meanwhile, the battery cell 110 can be manufactured by joining both ends 114a and 114b of the cell case 114 and one side part 114c connecting them in a state in which an electrode assembly (not shown) is housed in a cell case 114. In other words, the battery cells 110 according to the present embodiment have a total of three sealing portions, the sealing portion has a structure in which it is sealed by a method such as heat fusion, and the other side portion can be composed of a connection portion 115. The cell case 114 can be composed of a laminate sheet including a resin layer and a metal layer.

Meanwhile, referring to FIGS. 4 and 6, the battery cells 110 according to the present embodiment may include a first terrace portion T1, a second terrace portion T2, and a central portion M positioned between the first terrace portion T1 and the second terrace portion T2. That is, a cell body 113 may be divided into a first terrace portion T1, a second terrace portion T2, and a central portion M.

Here, the first terrace portion T1 is a region including one end 114a from which the first electrode lead 111 protrudes, and the second terrace portion T2 is a region including the other end 114b from which the second electrode lead 112 protrudes.

Such a battery cell 110 may be composed of a plurality of cells, and the plurality of battery cells 110 may be stacked together so as to be electrically connected with each other, thereby forming the battery cell stack 200. In particular, as shown in FIG. 3, a plurality of battery cells 110 may be stacked along a direction parallel to the x-axis. Thereby, the first and second electrode leads 111 and 112 may protrude in the y-axis direction and the −y-axis direction, respectively.

Referring to FIGS. 5 and 6, the cooling fin 300 according to the present embodiment includes a first zone 310, a second zone 320, and a third zone 330. The first zone 310 and the second zone 320 are arranged so as to be spaced apart from each other in a direction parallel to the direction in which the first electrode lead 111 and the second electrode lead 112 protrude (y-axis direction), and the third zone 330 is arranged between the first zone 310 and the second zone 320.

In this case, the thickness t3 of the third zone 330 is thinner than the thickness t1 of the first zone 310 and the thickness t2 of the second zone. In other words, the cooling fin 300 according to the present embodiment has a structure in which both ends of the first electrode lead 111 and the second electrode lead 112 are thicker than the central portion in a direction parallel to the protruding direction (y-axis direction). Specifically, the first zone 310, the second zone 320, and the third zone 330 of the cooling fin 300 may be positioned to correspond to the first terrace portion T1, the second terrace portion T2 and the central portion M of the battery cell 110, respectively. When the cooling fins 300 having a thickness in difference according to the present embodiment are disposed between the battery cells 110, a distance d3 between the central portion M and the third zone 330 is wider than a distance d1 between the first terrace portion T1 and the first zone 310. Also, the distance d3 between the central portion M and the third zone 330 is wider than the distance d2 between the second terrace portion T2 and the second zone 320. In FIG. 6, the thickness difference and the distance difference are slightly exaggerated for convenience of explanation.

The cooling fins 300 may include a metal material having high thermal conductivity. The specific material is not limited, and may include aluminum (Al) as an example. Although only one cooling fin 300 is shown in FIG. 3, all of the cooling fins 300 according to the present embodiment may be arranged between the battery cells 110.

In the following, the advantages of the cooling fin according to the present embodiment in the swelling control of the battery cell will be described with reference to FIGS. 2a, 6 and 7. Referring to FIGS. 2a and 7, in the process of repeatedly charging and discharging the battery cells 11, a phenomenon where the internal electrolyte is decomposed and gas is generated so that the battery cell 11 swells up, that is, a swelling phenomenon, may occur. Comparing the degree of swelling, the central portion of the battery cell 11 is swelled more largely. Similarly, in the battery cell 110 according to the present embodiment, the central portion M is swelled to be larger than that of the first terrace portion T1 and the second terrace portion T2.

Since the conventional plate-shaped cooling fins 30 have a constant thickness, it is not possible to effectively control the battery cells 11 having different degrees of swelling for each zone. On the other hand, the cooling fin 300 according to the present embodiment can apply a uniform pressure to the battery cells 110 at the time of swelling of the battery cells 110 since the first zone 310 and the second zone 320, which are both end portions, are thicker than the third zone 330. That is, in other words, considering the difference in the degree of swelling between the zones of the battery cells 110, the thicknesses t1 and t2 of the first zone 310 and the second zone 320 were set to be thicker than the thickness t3 of the third zone 330 so that a uniform elastic force can act. Since the pressure deviation acting on the swelling of the battery cell 110 can be minimized in this way, it is possible to prevent structural deformation of the battery module 100 due to swelling, and to enhance the durability of the battery module 100.

As described above, the battery cell 110 according to the present embodiment is a pouch-type battery and is manufactured by sealing the cell case 114. Depending on the sealing structure, the first terrace portion T1 and the second terrace portion T2 can have a structure in which the thickness decreases toward the first electrode lead 111 and the second electrode lead 112, respectively. In order to be able to face the first terrace part T1 and the second terrace part T2 more closely, the first zone 310 and the second zone 320 may be configured to become thinner as they are closer to the third zone 330. That is, the first zone 310 and the second zone 320 may become thinner from the outside toward the third zone 330. The cooling fins 300 can closely correspond to the first terrace portion T1 and the second terrace portion T2, and thus can be effective for swelling control.

On the other hand, referring to FIGS. 2b, 4 and 6, when the battery cell 11 is repeatedly charged and discharged, a large amount of heat is generated in the electrode lead 11L portion of the battery cells 11. Thereby, the terrace portions T1 and T2, which are the regions including the end portions in the direction in which the electrode leads 11L protrude, show a more excessive degree of heat generation than other portions. Similarly, the battery cell 110 according to the present embodiment also shows a higher temperature in the first terrace portion T1 and the second terrace portion T2 than that in the central portion M. Depending on the case, in the worst case, the first terrace portion T1 and the second terrace portion T2 can show a temperature about 4.5 degrees Celsius higher than that in the central portion M.

Since the conventional plate-shaped cooling fin 30 has a constant thickness with respect to the battery cell 110, in which difference in the degree of heat generation is excessive for each portion, it is difficult to eliminate the temperature deviation between the portions of the battery cell 110. Unlike this, the first zone 310 and the second zone 320 according to the present embodiment can be positioned close to the first terrace portion T1 and the second terrace portion T2 when compared to between the third zone 330 and the central portion M. In other words, the cooling fin 300 according to the present embodiment can increase the contact and adhesion with the portion of the battery cells where heat generation is excessive. Thereby, heat dissipation can be effectively made in the portion of the battery cell 110 where heat generation is excessive, and the temperature deviation between the respective portions with respect to one battery cell 110 can be minimized Since the temperature deviation between the respective portions of the battery cell 110 ultimately causes a deterioration in the performance of the battery module 100, the cooling fins 300 according to the present embodiment can contribute to improving the performance and lifespan of the battery module.

Meanwhile, referring back to FIG. 6, the first zone 310 and the second zone 320 may respectively have an empty space formed therein. In order to achieve the thickness difference between the first zone 310, the second zone 320, and the third zone 330 as described above, the first zone 310 and the second zone 320 may form an empty space formed therein. More specifically, the cooling fin 300 may be a metal plate material having an air layer AL formed therein. In one example, it may be a structure in which a metal plate material such as aluminum (Al) forms a two-layer structure and an air layer (AL) is formed therebetween. The thickness difference between the first zone 310, the second zone 320 and the third zone 330 may be realized by adjusting the distance between the metal plate materials.

In the case of simply a single metal plate material, like a conventional cooling fin (30, see FIG. 1), there is no problem in transferring the heat generated in the battery cells 11, but it is difficult to cut off the fire generated in the battery cells 11 from propagating to the adjacent battery cells 11. On the other hand, the cooling fin 300 according to the present embodiment has an air layer AL formed therein, and the air layer AL can function as a heat insulating layer. Even if a fire occurs due to heat generation in any one of the battery cells 110, the propagation of fire or heat to the adjacent battery cells 110 can be delayed due to the air layer AL provided between the battery cells 110. That is, it is possible to secure a time required for the fire to propagate to the peripheral battery cells 110 and thus improve the safety of the battery module 100. In particular, when the corresponding battery module 100 is included in a vehicle battery pack, it is possible to delay the propagation of the fire between the battery cells 110 and thus secure a time margin for the driver to evacuate from the fire. In addition, since the metal plate material of the two-layer structure faces each of the battery cells 110, there is no abnormality in heat transfer in the upward or downward direction of the battery module 100. In particular, since the cooling fins 300 are in direct contact with a thermal conductive resin layer 1300 described later, there is no risk of deterioration in heat transfer performance That is, the cooling fin 300 according to the present embodiment has the cooling and heat dissipation performance and, at the same time, can cut off a fire generated from one battery cell from propagating to adjacent battery cells.

Further, since the cooling fin 300 according to the present embodiment is a metal plate material having a two-layer structure, it is easy for the elastic restoring force to act on the swelling of the battery cell 110. Due to this elastic restoring force, it is possible to reduce the pressure transferred to the battery cell 110 positioned on the opposite side at the time of swelling of the battery cell 110. That is, it is easier to control swelling.

Hereinbelow, a battery module according to an embodiment of the present disclosure will be described with reference to FIGS. 3 and 8. FIG. 8 is a perspective view showing a battery module according to an embodiment of the present disclosure.

Referring to FIGS. 3 and 8, the battery module 100 according to an embodiment of the present disclosure may include a battery cell stack 200, first and second sensing blocks 410 and 420, an elastic member 700 and a side surface pad 600. As described above, the battery cell stack 200 can be formed by stacking the battery cells 110 with the cooling fins 300 interposed therebetween.

The first sensing block 410 and the second sensing block 420 may include a material having electrical insulation, for example, a plastic material, a polymer material, or a composite material. Further, a first sensing block 410 and a second sensing block 420 may have a kind of basket form, and may be configured so as to cover the front surface and the rear surface of the battery cell stack 200, respectively. Although not specifically shown, the first and second electrode leads 111 and 112 of the battery cells 110 pass through the slits formed in the first sensing block 410 or the second sensing block 420, and then can join to each other to form an electrode lead assembly.

The elastic member 700 may be configured to cover both side surfaces of the first sensing block 410, the second sensing block 420 and the battery cell stack 200. In particular, the upper surface and the lower portion of the elastic member 700 may be opened so that the upper surface and the lower surface of the battery cell stack 200 can be exposed to the outside, and therefore, the battery module 100 according to the present embodiment can be effective for heat dissipation. As long as the elastic member 700 has a predetermined elastic force, the material thereof is not particularly limited. In one example, it may include at least one of a composite material such as fiber-reinforced plastic (FRB), and a metal alloy.

The side surface pads 600 can be arranged on both side surfaces of the battery cell stack 200 to supplement the rigidity of the battery module 100. That is, the plate-shaped side surface pads 600 may be positioned between the both side surfaces of the battery cell stack 200 and the elastic member 700.

Here, the front surface means a surface of the battery cell stack 200 in the y-axis direction, the rear surface means a surface of the battery cell stack 200 in the −y-axis direction, and the both side surfaces mean the surfaces of the battery cell stack 200 in the x-axis and −x-axis directions, respectively. Further, the lower surface means a surface of the battery cell stack 200 in the −z-axis direction, and the upper surface means a surface of the battery cell stack 200 in the z-axis direction. However, these are the surfaces indicated for convenience of explanation, and may vary depending on a location of an object, a position of an observer, or the like. The front surface and the rear surface of the battery cell stack 200 may be surfaces on which the protruding first and second electrode leads 111 and 112 of the battery cells 110 are arranged.

On the other hand, the battery module 100 shown in FIG. 8 is an exemplary structure of one of the battery modules including the battery cell stack 200 and the cooling fins 300. That is, although not specifically shown, the battery module according to another embodiment of the present disclosure can be manufactured by housing the battery cell stack 200 in a module frame and an end plate, and then weld-joining the module frame and the end plate.

Hereinbelow, a battery pack according to an embodiment of the present disclosure will be described in detail with reference to FIGS. 9 and 10.

FIG. 9 is an exploded perspective view showing a battery pack according to an embodiment of the present disclosure. FIG. 10 is a cross-sectional view showing a cross-section taken along the cutting line B-B' of FIG. 9. At this time, in FIG. 10, the cross section is shown on the assumption that the battery module 100, the thermal conductive resin layer 1300, and the bottom portion 1110 of the pack frame 1100 of FIG. 9 are in a state of making contact with each other, unlike FIG. 9.

Referring to FIGS. 9 and 10, the battery pack 1000 according to an embodiment of the present disclosure includes a battery module 100, a pack frame 1100 for housing the battery module 100, and a thermal conductive resin layer 1300 positioned between the battery module 100 and the bottom portion 1110 of the pack frame 1100.

The battery module 100 includes a battery cell stack 200 and a cooling fin 300 as described above. Since the description of the battery module 100 overlaps with the contents previously mentioned, the description thereof will be omitted.

The battery pack 1000 may further include an upper cover 1200 for covering the pack frame 1100. That is, a plurality of battery modules 100 can be housed between the pack frame 1100 and the upper cover 1200.

The thermal conductive resin layer 1300 may be formed by applying a thermal conductive resin to the bottom portion 1110. Specifically, the thermal conductive resin layer 1300 can be formed by applying the thermal conductive resin onto the bottom portion 1110, positioning the battery module 100 according to the present embodiment on the bottom portion, and then curing the thermal conductive resin.

The thermal conductive resin may include a thermal conductive adhesive material, and specifically, it may include at least one of a silicone material, a urethane material, and an acrylic material. The thermal conductive resin is a liquid during application but is cured after application, so that it can perform the role of fixing a plurality of battery cells 110 constituting the battery cell stack 200. Further, the thermal conductive resin is excellent in heat transfer properties, and thus can quickly transfer the heat generated from the battery cells 100 to the bottom portion 1110, thereby preventing overheating of the battery pack 1000.

Referring to FIGS. 3, and 8 to 10, the lower portion of the elastic member 700 is opened so that the lower surface of the battery cell stack 200 can be exposed as described above. The lower surface of the battery cell stack 200 can be in contact with the thermal conductive resin layer 1300. Since the battery cell 110 according to the present embodiment is in direct contact with the thermal conductive resin layer 1300 as shown in FIG. 10, the heat transfer path in the lower direction of the battery module 100 can be simplified, and the possibility of generating an air layer such as an air gap can be reduced. Therefore, the cooling performance of the battery module 100 and the battery pack 1000 including the battery module 100 can be improved.

Further, the cooling fins 300 according to the present embodiment extend from the lower surface of the battery cell stack 200 and make contact with the thermal conductive resin layer 1300. Since the lower surface of the battery cell stack 200 is exposed, the cooling fins 300 positioned between the battery cells 110 can be in direct contact with the thermal conductive resin layer 1300 on the bottom portion 1110. By configuring the cooling fins 300 facing the battery cells 110 so as to be in direct contact with the thermal conductive resin layer 1300, heat discharge performance can be maximized.

On the other hand, it is essential to fix the battery cell 110 exposed for the structural safety of the battery pack 1000. Since each battery cell 110 constituting the battery module 100 is fixed in a state of making contact with the heat conductive resin layer 1300, the structural safety can be supplemented.

Further, since the number of parts in the height direction of the battery pack 1000 is reduced, the degree of space utilization can be increased, and the capacity and output of the battery module can be increased.

Even though the terms indicating directions such as upper, lower, left, right, front and rear directions are used herein, it is obvious to those skilled in the art that these merely represent relative positions for convenience in explanation and may vary depending on a position of an observer, a position of an object, or the like.

The one or more battery modules according to the present embodiment as described above can be mounted together with various control and protection systems such as a battery management system (BMS) and a cooling system to form a battery pack.

The battery module or the battery pack can be applied to various devices. Specifically, these devices can be applied to vehicle means such as an electric bicycle, an electric vehicle, a hybrid vehicle, but the present disclosure is not limited thereto and can be applied to various devices that can use the secondary battery.

Although the preferred embodiments of the present disclosure have been described in detail above, the scope of the present disclosure is not limited thereto, and various modifications and improvements made by those skilled in the art using the basic concepts of the present disclosure defined in the following claims also falls within the spirit and scope of the present disclosure.

DESCRIPTION OF REFERENCE NUMERALS

100: battery module
110: battery cell
300: cooling fin
310: first zone
320: second zone
330: third zone

The invention claimed is:

1. A battery module comprising:
a battery cell stack comprising a plurality of battery cells, each of the plurality of battery cells including a first electrode lead and a second electrode lead; and
a cooling fins positioned between the plurality of battery cells,
wherein the first electrode lead and the second electrode lead protrude from each of the plurality of battery cells in opposite directions,
wherein the cooling fin comprises a first zone, a second zone and a third zone,
wherein the first zone and the second zone are spaced apart from each other along a direction parallel to a protruding direction of the first electrode lead and the second electrode lead,
wherein the third zone is between the first zone and the second zone, and
wherein a width of the third zone is smaller than a width of the first zone and a width of the second zone.

2. The battery module of claim 1, wherein:
the battery cell comprises a first terrace portion, a second terrace portion, and a central portion between the first terrace portion and the second terrace portion,
the first electrode lead protrudes from one end of the first terrace portion,
the second electrode lead protrudes from one end of the second terrace portion, and the first zone, the second zone, and the third zone are positioned to correspond to the first terrace portion, the second terrace portion, and the central portion, respectively.

3. The battery module of claim 2, wherein:
a distance between the central portion and the third zone is greater than a distance between the first terrace portion and the first zone.

4. The battery module of claim 2, wherein,
a distance between the central portion and the third zone is greater than a distance between the second terrace portion and the second zone.

5. The battery module of claim 1, wherein,
the width of the first zone and the width of the second zone are gradually reduced toward the third zone.

6. The battery module of claim 1, wherein each of
the first zone and the second zone have a space formed therein.

7. The battery module of claim 1, wherein,
the cooling fin is a metal plate having an air layer formed therein.

8. The battery module of claim 1, wherein,
the battery cell is a pouch-type battery cell.

9. A battery pack comprising:
the battery module according to claim 1;
a pack frame for housing the battery module; and
a thermal conductive resin layer between the battery module and a bottom portion of the pack frame,
wherein the cooling fins extends from a lower surface of the battery cell stack, and
wherein the cooling fin is in contact with the thermal conductive resin layer.

10. The battery pack of claim 9, wherein
the lower surface of the battery cell stack is in contact with the thermal conductive resin layer.

* * * * *